(12) United States Patent
Jeong et al.

(10) Patent No.: US 8,594,066 B2
(45) Date of Patent: Nov. 26, 2013

(54) APPARATUS AND METHOD FOR MANAGING CHANNEL RESOURCE IN BEACON-ENABLED WIRELESS PERSONAL AREA NETWORK (WPAN)

(75) Inventors: Wu Cheol Jeong, Daejeon (KR); Chang Sub Shin, Daejeon (KR); Tae Joon Park, Daejeon (KR); Hoyong Kang, Daejeon (KR); Se Han Kim, Daejeon (KR); In Hwan Lee, Daejeon (KR); Cheol Sig Pyo, Daejeon (KR)

(73) Assignee: Electronics and Telecommuniations Research Institute, Daejeon (KR)

( * ) Notice: Subject to any disclaimer, the term of this patent is extended or adjusted under 35 U.S.C. 154(b) by 172 days.

(21) Appl. No.: 13/181,598

(22) Filed: Jul. 13, 2011

(65) Prior Publication Data

US 2012/0014414 A1    Jan. 19, 2012

Related U.S. Application Data

(60) Provisional application No. 61/363,666, filed on Jul. 13, 2010, provisional application No. 61/363,858, filed on Jul. 13, 2010.

(30) Foreign Application Priority Data

Oct. 7, 2010 (KR) .......................... 10-2010-0097779
Jun. 13, 2011 (KR) .......................... 10-2011-0056912

(51) Int. Cl.
*H04W 4/00* (2009.01)

(52) U.S. Cl.
USPC ....................................................... 370/338

(58) Field of Classification Search
USPC ......................... 370/328–339; 375/130–137
See application file for complete search history.

(56) References Cited

U.S. PATENT DOCUMENTS

| | | |
|---|---|---|
| 6,606,342 B1 * | 8/2003 | Banister .................... 375/130 |
| 2009/0168846 A1 | 7/2009 | Filippo, III |
| 2010/0111139 A1 * | 5/2010 | Arnott et al. ............... 375/133 |

FOREIGN PATENT DOCUMENTS

KR    1020080028269 A    3/2008

* cited by examiner

*Primary Examiner* — Frank Duong
(74) *Attorney, Agent, or Firm* — William Park & Associates Patent Ltd.

(57) ABSTRACT

Provided are a node device of a beacon-enabled Wireless Personal Area Network (WPAN) managing a channel resource and a method thereof. The node device may generate a pseudo random binary sequence (PRBS) and generate a hopping sequence based on a number of available channels using the PRBS, thereby generating a hopping sequence having a characteristic of pseudo randomness and selecting a channel to be hopped, using the hopping sequence.

18 Claims, 4 Drawing Sheets

APPARATUS AND METHOD FOR MANAGING CHANNEL RESOURCE IN BEACON-ENABLED WIRELESS PERSONAL AREA NETWORK (WPAN)

CROSS-REFERENCE TO RELATED APPLICATIONS

This application claims the priority benefit of U.S. Provisional Patent Application No. 61/363,666, filed on Jul. 13, 2010, and U.S. Provisional Patent Application No. 61/363,858, filed on Jul. 13, 2010 in the USPTO and Korean Patent Application No. 10-2010-0097779, filed on Oct. 7, 2010, and Korean Patent Application No. 10-2011-0056912, filed on Jun. 13, 2011, in the Korean Intellectual Property Office, the disclosures of which are incorporated herein by reference.

BACKGROUND

1. Field of the Invention

The present invention relates to a method of generating and managing a base channel hopping sequence for a Media Access Control (MAC) system using a time-division based channel hopping scheme, to enhance the throughput degradation occurring due to radio interference in a multi-hopping environment.

2. Description of the Related Art

The most representative Media Access Control (MAC) technology used to embody a service requiring a real-time property and a high reliability in a low power based Wireless Sensor Network (WSN) system may support communication for an active duration after assigning an independent active duration according to a scheduling method. For communication with another node device, a node device may receive data using Carrier Sense Multiple Access-Collision Avoidance (CSMA-CA) for a contention access period (CAP). In a beacon-enabled operation mode, when a node device desires a deterministic channel access, the node device may be assigned with an independent time slot called a guaranteed time slot (GTS), and may perform the channel access. However, since such Media Access Control (MAC) system employs a single frequency for a link usage period, the MAC system may be weak against an interference signal of the same radio frequency (RF) band and may not variably schedule a communication link bandwidth.

To solve the above issue in the MAC system using the single frequency, proposed is a channel access scheme of a time-division based channel hopping scheme. A channel hopping sequence for channel hoping enables definition in an MAC upper layer based on a user circumstance. However, various multiple physical (PHY) layers may not be supported and pseudo randomness of a sequence being used may not be guaranteed.

SUMMARY

An aspect of the present invention provides a method and apparatus that may manage a channel resource in a beacon-enabled Wireless Personal Area Network (WPAN).

Another aspect of the present invention also provides a method and apparatus that may generate a hopping sequence having a characteristic of pseudo randomness and thereby manage a channel resource in a beacon-enabled WPAN.

According to an aspect of the present invention, there is provided a node device of a beacon-enabled Wireless Personal Area Network (WPAN) managing a channel resource, the node device including: a pseudo random binary sequence (PRBS) generator to generate a PRBS; a hopping sequence generator to include a verified element value in a hopping sequence and thereby generate the hopping sequence when the verified element value is less than a maximum number of channels, the verified element value being obtained by sequentially verifying element values of the PRBS, starting from a first element, until a number of elements included in the hopping sequence becomes identical to the maximum number of channels; and a channel selector to select a channel to be used in a temporally divided time slot, using the hopping sequence.

According to another aspect of the present invention, there is provided a node device of a beacon-enabled Wireless Personal Area Network (WPAN) managing a channel resource, the node device including: a pseudo random binary sequence (PRBS) generator to generate a PRBS; a hopping sequence generator to generate a temporary hopping sequence including a number of elements corresponding to a maximum number of channels, to generate a temporary PRBS by extracting, from the PRBS, the number of elements corresponding to the maximum number of channels, to swap a primary element and a secondary element by setting, as the primary element, an element of the temporary hopping sequence corresponding to an order number obtained by sequentially verifying element values of the temporary PRBS, starting from a first element with respect to all the elements included in the temporary PRBS, and by setting, as the secondary element, an element cyclic shifted by an element value that is verified at a position of the primary element, and to generate, as a hopping sequence, the temporary hopping sequence that is swapped using all the element values included in the temporary PRBS; and a channel selector to select a channel to be used in a temporally divided time slot, using the hopping sequence.

According to still another aspect of the present invention, there is provided a method of managing a channel resource in a node device of a beacon-enabled Wireless Personal Area Network (WPAN), the method including: generating a pseudo random binary sequence (PRBS); generating a hopping sequence by including a verified element value in the hopping sequence when the verified element value is less than a maximum number of channels, the verified element value being obtained by sequentially verifying element values of the PRBS, starting from a primary element; repeating the generating of the hopping sequence until a number of elements included in the hopping sequence becomes identical to the maximum number of channels; and selecting a channel to be used in a temporally divided time slot, using the hopping sequence.

According to a yet another aspect of the present invention, there is provided a method of managing a channel resource in a node device of a beacon-enabled Wireless Personal Area Network (WPAN), the method including: generating a pseudo random binary sequence (PRBS); generating a temporary hopping sequence including a number of elements corresponding to a maximum number of channels; generating a temporary PRBS by extracting, from the PRBS, the number of elements corresponding to the maximum number of channels; swapping a primary element and a secondary element by setting, as the primary element, an element of the temporary hopping sequence corresponding to an order number obtained by sequentially verifying elements of the temporary PRBS, starting from a first element with respect to all the elements included in the temporary PRBS, and by setting, as the secondary element, an element cyclic shifted by an element value that is verified at a position of the primary element; performing the swapping using all the element values included in the temporary PRBS; setting, as a hopping sequence, the temporary hopping sequence that is swapped using all the element values included in the temporary PRBS; and selecting a channel to be used in a temporally divided time slot, using the hopping sequence.

According to embodiments of the present invention, there may be provided a node device and method for managing a channel resource by generating a hopping sequence having a characteristic of pseudo randomness in a beacon-enabled WPAN. Accordingly, it is possible to decrease radio interference with a different wireless apparatus occurring due to the pseudo randomness of a sequence. Also, maximum channel multiplexing effect may be achieved in a probabilistic average aspect without knowledge about a radio channel environment. Also, with respect to a physical (PHY) layer having a plurality of different available frequency channels, it is possible to generate a variable common channel sequence within a WPAN.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Figure 1:
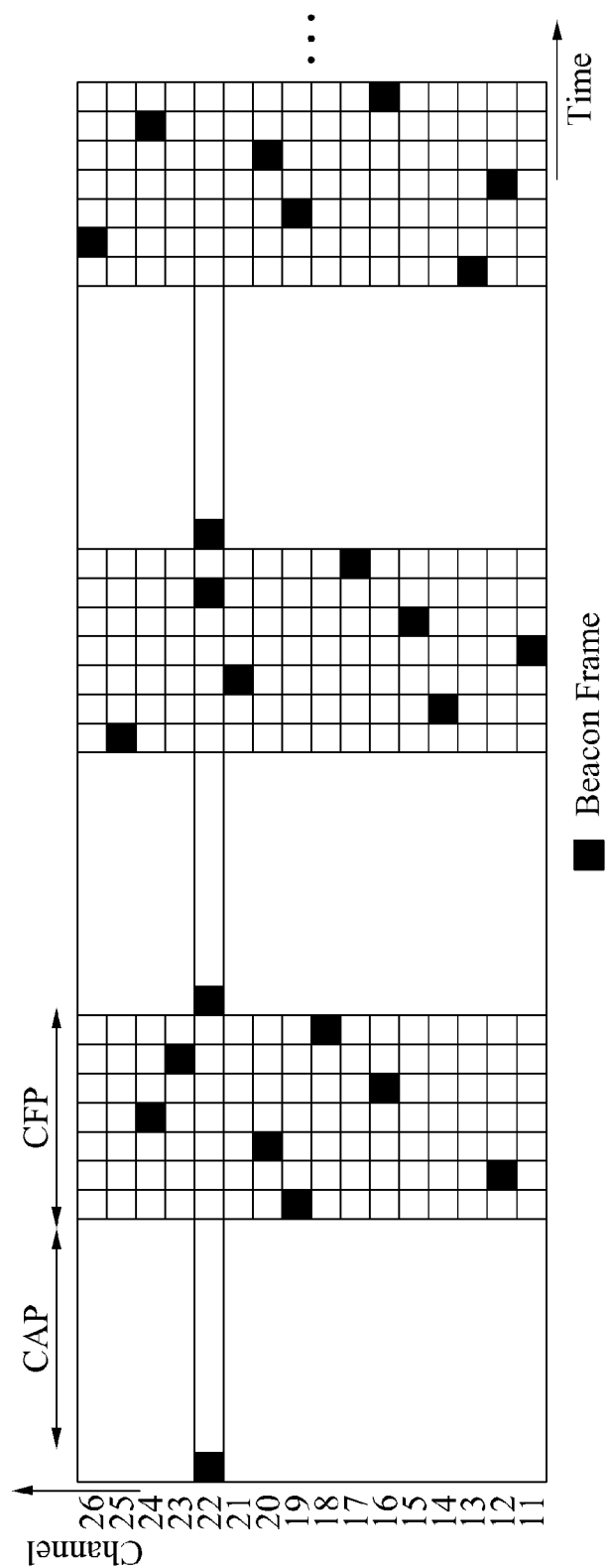
FIG. 1 is a diagram illustrating an example of time division channel hopping in a node device of a beacon-enabled wireless personal area network (WPAN) according to an embodiment of the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

According to an embodiment of the present invention, there may be provided a node device and a method for managing a channel resource by generating a hopping sequence having a characteristic of pseudo randomness in a beacon-enabled wireless personal area network (WPAN).

FIG. 1 is a diagram illustrating an example of time division channel hopping in a node device of a beacon-enabled WPAN according to an embodiment of the present invention.

Referring to FIG. 1, the node device of the beacon-enabled WPAN may generate a hopping sequence and thereby select a channel to be hopped. Here, the hopping sequence may have a frame structure having temporally divided time slots and a plurality of channel resources available in the respective time slots, and may have a characteristic of pseudo-randomness. In FIG. 1, a black dotted portion indicates the channel to be hopped.

In FIG. 1, a contention access period (CAP) denotes a contention based channel access section and a contention free period (CFP) denotes a non-contention based channel access section. In the CFP, a predetermined node device may be accessible to a channel using a guaranteed time slot (GTS) indicating a time slot assigned to the predetermined node device by a coordinator.

Figure 2:
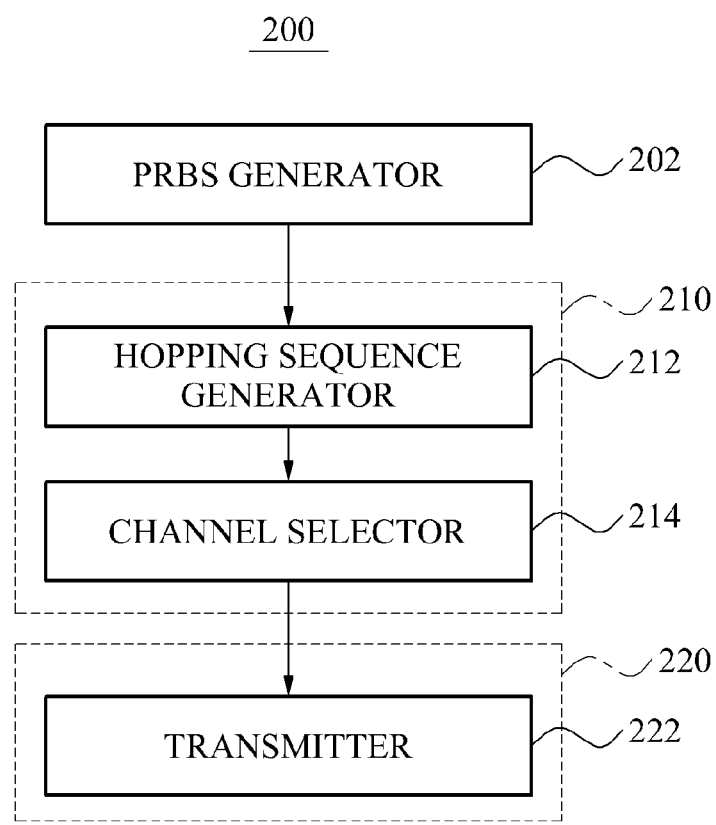
FIG. 2 is a block diagram illustrating a configuration of a node device to generate a hopping sequence in a beacon-enabled WPAN according to an embodiment of the present invention.

FIG. 2 is a block diagram illustrating a configuration of a node device 200 to generate a hopping sequence in a beacon-enabled WPAN according to an embodiment of the present invention.

Referring to FIG. 2, the node device 200 of the beacon-enabled WPAN may include a pseudo random binary sequence (PRBS) generator 202, a hopping sequence generator 212, a channel selector 214, and a transmitter 222. In this instance, the hopping sequence generator 212 and the channel selector 214 may be included in a MAC layer 210 and the transmitter 222 may be included in a physical (PHY) layer.

The PRBS generator 202 may generate a PRBS having pseudo randomness. The PRBS generator 202 may generate the PRBS by employing, as an initial value, a predetermined seed value in $12^{th}$-order or $9^{th}$-order polynomial expression of Equation 1:

$$12^{th}\text{-order polynomial expression: } x^{12}+x^{11}+x^{10}+x^{4}+1$$

$$9^{th}\text{-order polynomial expression: } x^{9}+x^{5}+1 \quad \text{[Equation 1]}$$

A linear shift register or a lookup table may be used to generate a sequence from the above polynomial expression.

A sequence generated from the $12^{th}$-order polynomial expression may be a sequence with the length of 4096 having element values within the range of "0" to "4095", and a sequence generated from the $9^{th}$-order polynomial expression may be a sequence with the length of 512 having element values within the range of "0" to "511".

The hopping sequence generator 212 may generate a hopping sequence, for example, macHoppingSequenceList, using the PRBS. According to an embodiment of the present invention, the hopping sequence generator 212 may generate the hopping sequence the following two methods:

As the first method, the hopping sequence generator 212 may include a verified element value in a hopping sequence and thereby generate the hopping sequence when the verified element value is less than a maximum number of channels, for example, phyChannelsSupported. Here, the verified element value may be obtained by sequentially verifying element values of the PRBS, starting from a first element, until a number of elements included in the hopping sequence becomes identical to the maximum number of channels. The maximum number of channels indicates a number of channels available in a PHY layer.

As the second method, the hopping sequence generator 212 may generate a temporary hopping sequence including a number of elements corresponding to a maximum number of channels, and may generate a temporary PRBS by extracting, from the PRBS, the number of elements corresponding to the maximum number of channels. The hopping sequence generator 212 may swap a primary element and a secondary element by setting, as the primary element, an element of the temporary hopping sequence corresponding to an order number obtained by sequentially verifying element values of the temporary PRBS, starting from a first element with respect to all the elements included in the temporary PRBS, and by setting, as the secondary element, an element cyclic shifted by an element value that is verified at a position of the primary element, and to generate, as a hopping sequence, the temporary hopping sequence that is swapped using all the element values included in the temporary PRBS. In this example, the hopping sequence generator 212 may generate {0, 1, 2, . . . , the maximum number of channels—1} as the temporary hopping sequence.

The channel selector 214 may select a channel to be used in a temporally divided time slot, using the hopping sequence generated by the hopping sequence generator 212. That is, the channel selector 214 may select a channel to be hopped.

The channel selector 214 may select the channel to be hopped according to Equation 2 through Equation 4:

$$CH=\text{macHoppingSequenceList}(i+\text{phyChannelsSupported}) \quad \text{[Equation 2]}$$

$$CH=\text{macHoppingSequenceList}((i+\text{channel offset})\%\text{phyChannelsSupported}) \quad \text{[Equation 3]}$$

$$CH=\text{macHoppingSequenceList}((i+\text{channel offset}+BSN)\%\text{phyChannelsSupported}) \quad \text{[Equation 4]}$$

In Equation 2 through Equation 4, CH denotes the channel to be hopped, macHoppingSequenceList denotes the hopping sequence, i denotes an order number of the time slot, channel offset denotes an offset for collision avoidance of the channel, and BSN denotes a beacon sequence number. The BSN may be received from a Personal Area Network (PAN) coordinator.

The transmitter 222 may transmit a data frame, hopping to the channel selected by the channel selector 214.

Hereinafter, a method of generating a hopping sequence in a node device of a beacon-enabled WPAN constructed as above according to an embodiment of the present invention will be described.

Figure 3:
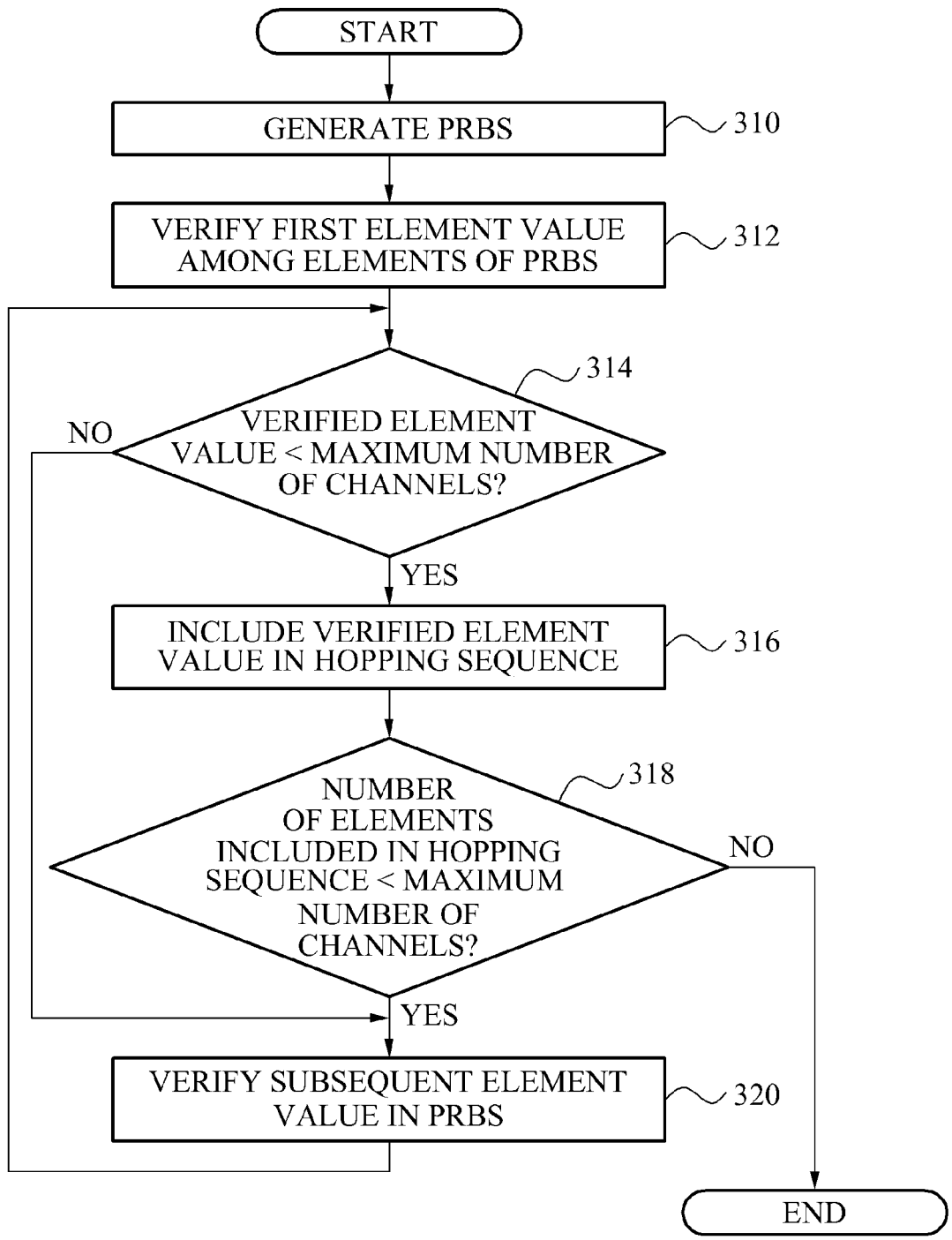
FIG. 3 is a flowchart illustrating a method of generating a hopping sequence in a node device of a beacon-enabled WPAN according to an embodiment of the present invention.

FIG. 3 is a flowchart illustrating a method of generating a hopping sequence in a node device of a beacon-enabled WPAN according to an embodiment of the present invention.

Referring to FIG. 3, in operation 310, the node device of the beacon-enabled WPAN may generate a PRBS. In operation 312, the node device may verify a first element value among elements of the PRBS.

In operation 314, the node device may verify whether the verified element value is less than a maximum number of channels. When the verified element value is greater than or equal to the maximum number of channels in operation 314, the node device may go to operation 320, which will be described after describing operation 318. Conversely, when the verified element value is less than the maximum number of channels in operation 314, the node device may include the verified element value in a hopping sequence in operation 316.

In operation 318, the node device may determine whether a number of elements included in the hopping sequence is less than the maximum number of channels. That is, the node device may verify whether the hopping sequence is completed.

When the number of elements included in the hopping sequence is less than the maximum number of channels in operation 318, the node device may verify a subsequent element value in the PRBS in operation 320 and then return to operation 314.

Conversely, when the number of elements included in the hopping sequence is greater than or equal to the maximum number of channels in operation 318, the node device may terminate this algorithm.

Figure 4:
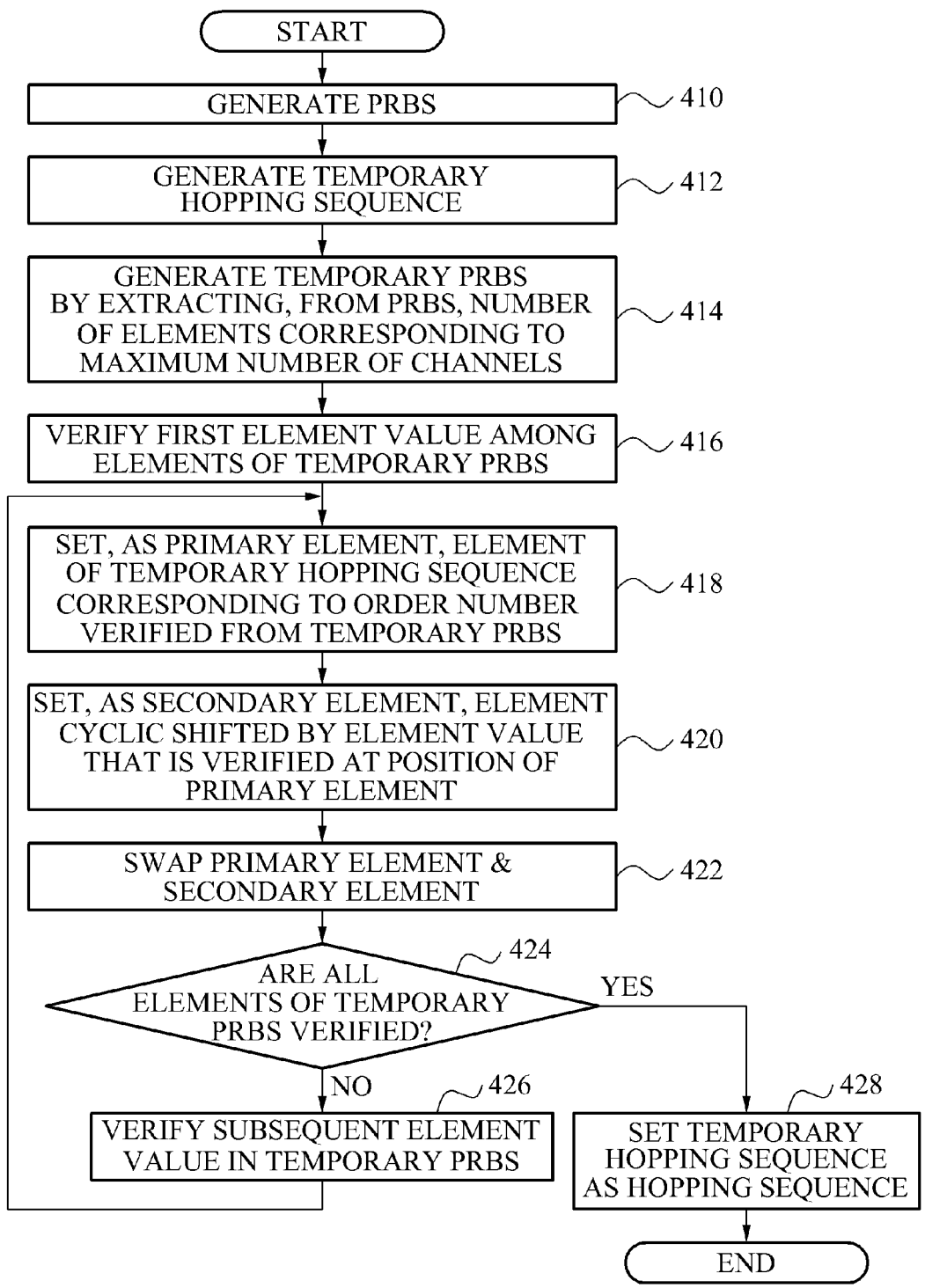
FIG. 4 is a flowchart illustrating a method of generating a hopping sequence in a node device of a beacon-enabled WPAN according to another embodiment of the present invention.

FIG. 4 is a flowchart illustrating a method of generating a hopping sequence in a node device of a beacon-enabled WPAN according to another embodiment of the present invention.

Referring to FIG. 4, in operation 410, the node device of the beacon-enabled WPAN may generate a PRBS. In operation 412, the node device may generate a temporary hopping sequence including a number of elements corresponding to a maximum number of channels. In operation 414, the node device may generate a temporary PRBS by extracting, from the PRBS, the number of elements corresponding to the maximum number of channels.

In operation 416, the node device may verify a first element value among elements of the temporary PRBS.

In operation 418, the node device may set, as a primary element, an element of the temporary hopping sequence corresponding to an order number verified from the temporary PRBS. In operation 420, the node device may set, as a secondary element, an element cyclic shifted by an element value that is verified at a position of the primary element. In operation 422, the node device may swap the primary element and the secondary element.

In operation 424, the node device may verify whether swapping of operation 422 is performed using all the elements of the temporary PRBS.

When the swapping is not performed using all the elements of the temporary PRBS in operation 424, the node device may verify a subsequent element value in the temporary PRBS in operation 426 and return to operation 418.

Conversely, when the swapping is performed using all the elements of the temporary PRBS in operation 424, the node device may set, as the hopping sequence, the temporary hopping sequence that is swapped using all the element values included in the temporary PRBS in operation 428.

The above-described exemplary embodiments of the present invention may be recorded in computer-readable media including program instructions to implement various operations embodied by a computer. The media may also include, alone or in combination with the program instructions, data files, data structures, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention, or vice versa.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A node device of a beacon-enabled Wireless Personal Area Network (WPAN) managing a channel resource, the node device comprising:

a pseudo random binary sequence (PRBS) generator to generate a PRBS;

a hopping sequence generator to include a verified element value in a hopping sequence and thereby generate the hopping sequence when the verified element value is less than a maximum number of channels, the verified element value being obtained by sequentially verifying element values of the PRBS, starting from a first element, until a number of elements included in the hopping sequence becomes identical to the maximum number of channels; and a channel selector to select a channel to be used in a temporally divided time slot, using the hopping sequence.

2. The node device of claim 1, wherein the channel selector obtains a remainder by dividing an order number of the time slot by the maximum number of channels and selects, as the channel, an element of an order number corresponding to the remainder in the hopping sequence.

3. The node device of claim 1, wherein the channel selector obtains a remainder by adding up a channel hopping offset value and the order number of the time slot and by dividing the addition result by the maximum number of channels, and selects, as the channel, an element of an order number corresponding to the remainder in the hopping sequence.

4. The node device of claim 1, wherein the channel selector obtains a remainder by adding up a channel hopping offset value and a beacon sequence number (BSN) to the order number of the time slot and by dividing the addition result by the maximum number of channels, and selects, as the channel, an element of an order number corresponding to the remainder in the hopping sequence.

5. The node device of claim 4, wherein the BSN is used to manage a channel resource received from a Personal Area Network (PAN) coordinator.

6. A node device of a beacon-enabled Wireless Personal Area Network (WPAN) managing a channel resource, the node device comprising:
    a pseudo random binary sequence (PRBS) generator to generate a PRBS;
    a hopping sequence generator to generate a temporary hopping sequence including a number of elements corresponding to a maximum number of channels, to generate a temporary PRBS by extracting, from the PRBS, the number of elements corresponding to the maximum number of channels, to swap a primary element and a secondary element by setting, as the primary element, an element of the temporary hopping sequence corresponding to an order number obtained by sequentially verifying element values of the temporary PRBS, starting from a first element with respect to all the elements included in the temporary PRBS, and by setting, as the secondary element, an element cyclic shifted by an element value that is verified at a position of the primary element, and to generate, as a hopping sequence, the temporary hopping sequence that is swapped using all the element values included in the temporary PRBS; and
    a channel selector to select a channel to be used in a temporally divided time slot, using the hopping sequence.

7. The node device of claim 6, wherein the hopping sequence generator generates $\{0, 1, 2, \ldots,$ the maximum number of channels$-1\}$ as the temporary hopping sequence.

8. The node device of claim 6, wherein the channel selector obtains a remainder by dividing an order number of the time slot by the maximum number of channels and selects, as the channel, an element of an order number corresponding to the remainder in the hopping sequence.

9. The node device of claim 6, wherein the channel selector obtains a remainder by adding up a channel hopping offset value and the order number of the time slot and by dividing the addition result by the maximum number of channels, and selects, as the channel, an element of an order number corresponding to the remainder in the hopping sequence.

10. The node device of claim 6, wherein the channel selector obtains a remainder by adding up a channel hopping offset value and a beacon sequence number (BSN) to the order number of the time slot and by dividing the addition result by the maximum number of channels, and selects, as the channel, an element of an order number corresponding to the remainder in the hopping sequence.

11. The node device of claim 10, wherein the BSN is used to manage a channel resource received from a Personal Area Network (PAN) coordinator.

12. A method of managing a channel resource in a node device comprising a hopping sequence generator and a channel selector of a beacon-enabled Wireless Personal Area Network (WPAN), the method comprising:
    generating a pseudo random binary sequence (PRBS);
    generating a hopping sequence, with the hopping sequence generator, by including a verified element value in the hopping sequence when the verified element value is less than a maximum number of channels, the verified element value being obtained by sequentially verifying element values of the PRBS, starting from a first element;
    repeating the generating of the hopping sequence, with the hopping sequence generator, until a number of elements included in the hopping sequence becomes identical to the maximum number of channels; and
    selecting, with the channel selector, a channel to be used in a temporally divided time slot, using the hopping sequence.

13. The method of claim 12, wherein the selecting comprises obtaining a remainder by adding up a channel hopping offset value and a beacon sequence number (BSN) to the order number of the time slot and by dividing the addition result by the maximum number of channels, and selecting, as the channel, an element of an order number corresponding to the remainder in the hopping sequence.

14. The method of claim 12, wherein the BSN is used to manage a channel resource received from a Personal Area Network (PAN) coordinator.

15. A method of managing a channel resource in a node device comprising a hopping sequence generator and a channel selector of a beacon-enabled Wireless Personal Area Network (WPAN), the method comprising:
    generating a pseudo random binary sequence (PRBS);
    generating a temporary hopping sequence, with the hopping sequence generator, by including a number of elements corresponding to a maximum number of channels;
    generating a temporary PRBS, with the hopping sequence generator, by extracting, from the PRBS, the number of elements corresponding to the maximum number of channels;
    swapping a primary element and a secondary element, with the hopping sequence generator, by setting, as the primary element, an element of the temporary hopping sequence corresponding to an order number obtained by sequentially verifying elements of the temporary PRBS, starting from a first element with respect to all the elements included in the temporary PRBS, and by setting, as the secondary element, an element cyclic shifted by an element value that is verified at a position of the primary element;
    performing the swapping, with the hopping sequence generator, by using all the element values included in the temporary PRBS;
    setting, as a hopping sequence, with the hopping sequence generator, the temporary hopping sequence that is swapped using all the element values included in the temporary PRBS; and
    selecting a channel, with the channel selector, to be used in a temporally divided time slot, using the hopping sequence.

16. The method of claim 15, wherein the generating of the temporary hopping sequence comprises generating {0, 1, 2, ..., the maximum number of channels−1} as the temporary hopping sequence.

17. The method of claim 15, wherein the selecting comprises obtaining a remainder by adding up a channel hopping offset value and a beacon sequence number (BSN) to the order number of the time slot and by dividing the addition result by the maximum number of channels, and selecting, as the channel, an element of an order number corresponding to the remainder in the hopping sequence.

18. The method of claim 17, wherein the BSN is used to manage a channel resource received from a Personal Area Network (PAN) coordinator.

* * * * *